United States Patent

Lee

(10) Patent No.: US 12,120,209 B2
(45) Date of Patent: Oct. 15, 2024

(54) APPARATUS AND METHOD FOR PROCESSING SENSOR SIGNAL

(71) Applicant: HYUNDAI MOBIS CO., LTD., Seoul (KR)

(72) Inventor: Dong Geun Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 340 days.

(21) Appl. No.: 17/678,135

(22) Filed: Feb. 23, 2022

(65) Prior Publication Data

US 2022/0272182 A1  Aug. 25, 2022

(30) Foreign Application Priority Data

Feb. 24, 2021  (KR) .......... 10-2021-0025157

(51) Int. Cl.
*H04L 69/324* (2022.01)
*H04L 69/00* (2022.01)
*H04L 67/12* (2022.01)

(52) U.S. Cl.
CPC .......... *H04L 69/324* (2013.01); *H04L 69/03* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,374,174 B1* | 6/2016 | Hammerschmidt | ........... H04L 25/0278 |
| 2014/0226645 A1* | 8/2014 | Tween | ........... H04W 84/005 370/338 |
| 2016/0218697 A1* | 7/2016 | Chin | ........... H03H 17/026 |
| 2016/0341762 A1* | 11/2016 | Waters | ........... G01P 15/125 |
| 2017/0331881 A1* | 11/2017 | Chandramouli | .. G06F 16/24568 |
| 2022/0070035 A1* | 3/2022 | Ferrer | ........... G06F 16/2365 |
| 2022/0173746 A1* | 6/2022 | Nakatsuka | ........... H03M 1/14 |

FOREIGN PATENT DOCUMENTS

KR  10-0569446 B1  4/2006

* cited by examiner

*Primary Examiner* — Jason E Mattis
*Assistant Examiner* — Bao G Nguyen
(74) *Attorney, Agent, or Firm* — NovoTechIP International PLLC

(57) ABSTRACT

Disclosed are an apparatus and method for processing a sensor signal. The apparatus for processing a sensor signal includes a sensing unit, an amplification unit configured to amplify an analog signal sensed by the sensing unit, an analog to digital converter (ADC) configured to convert the amplified analog signal into a digital signal having a first resolution, and a signal processor configured to process the digital signal with a numeral system having a second resolution or higher, allocate the processed digital signal to a message frame according to a regulated protocol, and output the message frame.

8 Claims, 4 Drawing Sheets

APPARATUS AND METHOD FOR PROCESSING SENSOR SIGNAL

CROSS-REFERENCE TO RELATED APPLICATION

This application claims priority from and the benefit of Korean Patent Application No. 10-2021-0025157, filed on Feb. 24, 2021, which is hereby incorporated by reference for all purposes as if set forth herein.

BACKGROUND

Field

Exemplary embodiments of the present disclosure relate to an apparatus and method for processing a sensor signal, and more particularly, to an apparatus and method for processing a sensor signal, which enable sensing data processed to have high resolution to be outputted without compressing the high-resolution data and a loss of the high-resolution data.

Discussion of the Background

In a vehicle, a braking and situation unit includes a digital pressure sensor for monitoring a hydraulic situation within a braking control apparatus or a hydraulic unit (HU) (i.e., a hydraulic source apparatus consisting of a pump, a driving motor, a tank and a relief valve or a hydraulic apparatus integrated to include a control valve of the hydraulic source apparatus) system in order to implement its additional function in different situations such as braking.

The digital pressure sensor may consist of a sensing strain gauge, an application specific integrated circuit (ASIC) and a passive element. In particular, the ASIC converts a sensed analog signal into a digital signal, codes the digital signal according to a regulated protocol, and outputs the coded digital signal.

In the digital pressure sensor, the process of converting the analog signal into the digital signal and the process of coding the digital signal according to the regulated protocol are separately performed. An ADC has different resolution depending on its processing capability, and output resolution thereof is fixed by the standard. Accordingly, the digital pressure sensor maintains higher ADC processing performance than signal output in order to prevent a loss of a sensed signal.

The ASIC of a conventional digital pressure sensor performs high-resolution data processing, but has a problem in that high-resolution data is essentially lost because the high-resolution data is compressed according to an output standard.

The Background of the present disclosure is disclosed in Korean Patent No. 10-0569446 (published on Apr. 7, 2006 and entitled "Optical Fiber Pressure Sensing System Using Optical Fiber.")

SUMMARY

Various embodiments are directed to providing an apparatus and method for processing a sensor signal, which enable sensing data processed to have high resolution to be outputted without compressing the high-resolution data and a loss of the high-resolution data.

Objects to be solved by the present disclosure are not limited to the aforementioned object, and the other objects not described above may be evidently understood from the following description by those skilled in the art.

In an embodiment, an apparatus for processing a sensor signal may include a sensing unit, an amplification unit configured to amplify an analog signal sensed by the sensing unit, an analog to digital converter (ADC) configured to convert the amplified analog signal into a digital signal having preset first resolution, and a signal processor configured to process the digital signal with a numeral system having preset second resolution or higher, allocate the processed digital signal to a message frame according to a preset regulated protocol, and output the message frame.

In an embodiment, the regulated protocol may be a single-edge nibble transmission (SENT) protocol, and a message frame according to the SENT protocol may be a SENT message frame.

In an embodiment, the SENT message frame may include a compatibility region including a tick time, a sync period and a slow channel, and a data region including a first data region and a second data region.

In an embodiment, the signal processor may process the digital signal with a $2^{second\ resolution}$ numeral system, may allocate a remainder according to the numeral system processing to the first data region of the SENT message frame, and may allocate a quotient according to the numeral system processing to the slow channel of the compatibility region or the second data region.

In an embodiment, a method of processing a sensor signal may include amplifying, by an amplification unit, an analog signal sensed by a sensing unit, converting, by an analog to digital converter (ADC), the amplified analog signal into a digital signal having preset first resolution, and processing, by a signal processor, the digital signal with a numeral system having preset second resolution or higher, allocating the processed digital signal to a message frame according to a preset regulated protocol, and outputting the message frame.

In an embodiment, the regulated protocol may be a single-edge nibble transmission (SENT) protocol, and a message frame according to the SENT protocol may be a SENT message frame.

In an embodiment, the SENT message frame may include a compatibility region including a tick time, a sync period and a slow channel, and a data region including a first data region and a second data region.

In an embodiment, in the outputting, the signal processor may process the digital signal with a $2^{second\ resolution}$ numeral system, may allocate a remainder according to the numeral system processing to the first data region of the SENT message frame, and may allocate a quotient according to the numeral system processing to the slow channel of the compatibility region or the second data region.

The apparatus and method for processing a sensor signal according to an aspect of the present disclosure can output high-resolution data without a loss of the high-resolution data without compressing the high-resolution data by processing the data, processed to have high resolution by the ADC, as a resolution numeral system having signal processor resolution or higher, allocating the data processed as the numeral system to a message frame according to a regulated protocol, and outputting the message frame. Furthermore, in a system that requires high precision control, such as an autonomous vehicle, a product performance and resolution increase are required. In order to tolerate an inevitable signal loss of an output standard, an output signal processor for applying a high-resolution output standard needs to be newly developed. If the present disclosure is applied, however, the performance of the existing sensor and controller can be improved without developing a new sensor and controller and a rise in cost.

Effects of the present disclosure are not limited to the aforementioned effects, and effects not described above may be evidently understood from the following description by those skilled in the art.

DETAILED DESCRIPTION OF THE ILLUSTRATED EMBODIMENTS

Figure 1:
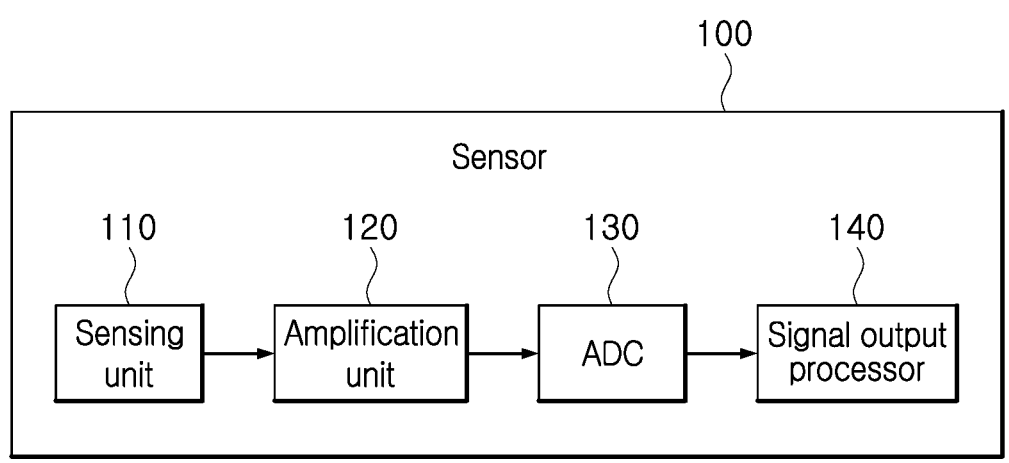
FIG. 1 is a block diagram schematically illustrating an apparatus for processing a sensor signal according to an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for processing a sensor signal will be described below with reference to the accompanying drawings through various exemplary embodiments. In such a process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Furthermore, an implementation described in this specification may be realized as a method or process, an apparatus, a software program, a data stream or a signal, for example. Although the present disclosure has been discussed only in the context of a single form of an implementation (e.g., discussed as only a method), an implementation having a discussed characteristic may also be realized in another form (e.g., an apparatus or a program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

Figure 2:
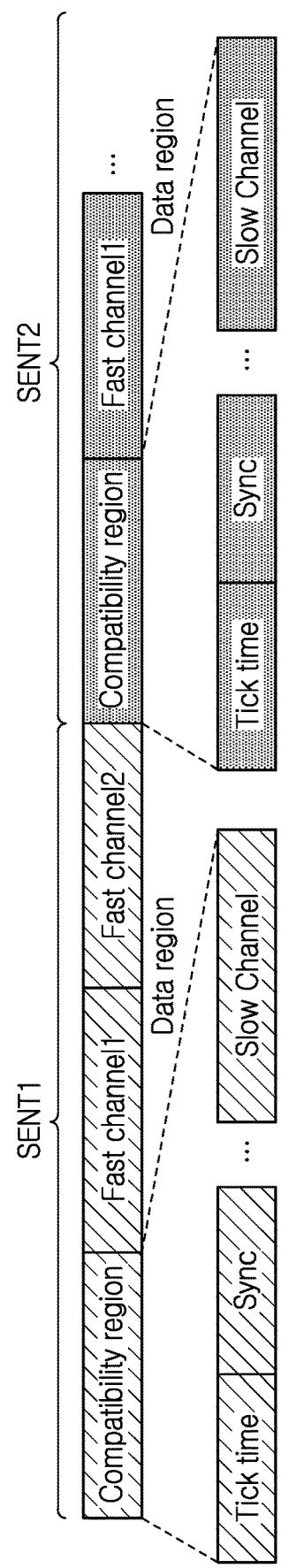
FIG. 2 is an exemplary diagram illustrating a SENT message frame according to an embodiment of the present disclosure.
Figure 3:
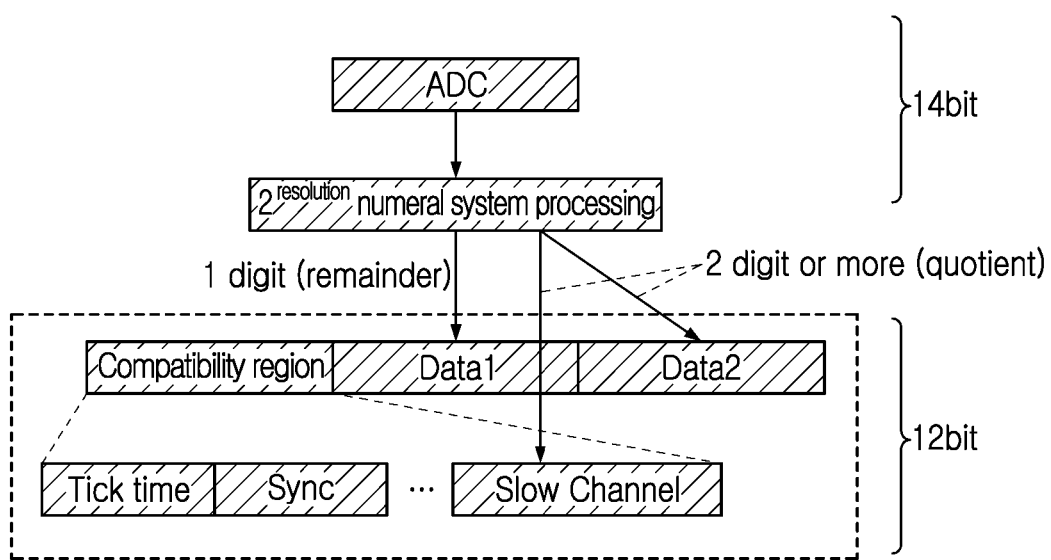
FIG. 3 is an exemplary diagram for describing an operation of a signal processor according to an embodiment of the present disclosure.

FIG. 1 is a block diagram schematically illustrating an apparatus for processing a sensor signal according to an embodiment of the present disclosure. FIG. 2 is an exemplary diagram illustrating a SENT message frame according to an embodiment of the present disclosure. FIG. 3 is an exemplary diagram for describing an operation of a signal processor according to an embodiment of the present disclosure.

Referring to FIG. 1, an apparatus 100 for processing a sensor signal according to an embodiment of the present disclosure may include a sensing unit 110, an amplification unit 120, an analog to digital converter (ADC) 130, and a signal processor 140.

The sensing unit 110 may detect sensor data and transmit a detected analog signal to the amplification unit 120. The sensing unit 110 may be various sensors, such as a pressure sensor, a hall sensor, and a throttle positioning sensor, but in the present embodiment, a digital pressure sensor is described as an example.

The amplification unit 120 may amplify the analog signal sensed by the sensing unit 110. In this case, the amplification unit 120 may amplify an electric signal of the sensing unit 110, may filter the amplified electric signal, and then may convert the filtered signal into a signal having a voltage level which may be processed.

The ADC 130 may convert the analog signal amplified by the amplification unit 120 into a digital signal having a preset first resolution. In this case, the first resolution means a resolution set in the ADC 130, and may be 14 bits, for example.

The signal processor 140 may process the digital signal, outputted by the ADC 130, as a numeral system having second resolution or higher, may allocate the processed digital signal to a message frame according to a preset regulated protocol, and may output the message form. In this case, the second resolution may mean a resolution set in the signal processor 140. The regulated protocol is a protocol for a digital interface for obtaining sensor data, and examples thereof may include a single edge nibble transmission (SENT) protocol, a local interconnect network (LIN), a controller area network (CAN), etc. However, in an embodiment of the present disclosure, SENT is described as an example. If the regulated protocol of the signal processor 140 is the SENT protocol, the second resolution may mean SENT resolution.

The SENT protocol is serial communication in which modulation is performed based on a time between continuous falling edges. The SENT protocol enables data transmission having high resolution at a lower cost than the existing serial communication, and is used in an engine control unit (ECU), etc. from a sensor for an application for data transmission.

A SENT message frame according to the SENT protocol may consist of a compatibility region and a data region as illustrated in FIG. 2.

The compatibility region is a region for indicating whether an output signal is compatible, and may include a tick time, a sync period, a status, and a slow channel. The tick time is timing (period) of the protocol, and may be a time agreed between a transmitter and a receiver. The sync period means the start of the message frame. The status may be used like the status, identification or data of the apparatus 100. The slow channel is a region for sensor error information or diagnosis information, may consist of 4 bits, and may be a region in which user information may be written.

The data region may consist of one or more fast channels in which output signal information is contained. Data of 12 bits may be allocated to each of the fast channels. In the data region, a separate signal measured by the sensor may be allocated to a second fast channel (Fast channel 2) or the second fast channel (Fast channel 2) may not be operated. In this case, a first fast channel (Fast channel 1) may be called a first data region, and the second fast channel (Fast channel 2) may be called a second data region.

The ADC 130 has different resolution depending on its processing capability. In general, an output resolution of the signal processor 140 is fixed by a standard, and the ADC 130 has higher processing performance than the signal processor 140 in order to prevent a loss of information of a sensed signal. For example, the ADC 130 may have 14-bit resolution, and the SENT protocol may have 12-bit resolution. In this case, conventionally, the signal processor 140 allocates a SENT output value, such as Equation 1 below, to the first data region of a SENT message frame, compresses only the first data region, and transmits the SENT message frame.

[Equation 1]
$$\text{SENT output value} = \text{measured pressure} \times \frac{\left(\begin{array}{c}\text{maximum resolution value} - \\ \text{minimum resolution value}\end{array}\right)}{\text{pressure range}} + \text{initial location value}$$

Conventionally, high-resolution data processing is performed in the apparatus 100 for processing a sensor signal, but high-resolution data is essentially lost due to signal compression for an output standard. That is, high-resolution processing is performed in the apparatus 100 for processing a sensor signal, but data may be lost because the output of the processing has low resolution.

Accordingly, the signal processor 140 of the present disclosure may enable the output of high-resolution data without data compression and enable a high-resolution output without a loss of signal information by processing the digital signal, outputted by the ADC 130, as a numeral system having resolution or higher of the signal processor 140 and allocating a numeral system-processed value to the compatibility region or plurality of data regions of the SENT message frame.

An operation of the signal processor 140 is specifically described with reference to FIG. 3. In this case, it is assumed that resolution of the ADC is 14 bits and a resolution of the signal processor 140 is 12 bits.

In this case, the signal processor 140 may process the digital signal outputted by the ADC 130 as a $2^{signal\ processor\ resolution}$ numeral system or a numeral system having a signal processor resolution or higher, may allocate a remainder according to the numeral system processing to the first data region (data 1) of the SENT message frame, and may allocate a quotient according to the numeral system processing to the slow channel or second data region (data 2) of the SENT message frame.

For example, when the signal processor 140 processes the digital signal outputted by the ADC 130 as the $2^{signal\ processor\ resolution}$ numeral system, results, such as Equation 2 below, may be obtained.

[Equation 2]
$$ADC\ \text{output signal}\ 2^{signal\ processor\ resolution}\ \text{numeral system} = \left(\text{measured pressure} \times \frac{\left(\begin{array}{c}\text{available maximum value of ADC resolution} - \\ \text{available minimum value of ADC resolution}\end{array}\right)}{\text{pressure range}} + \text{initial locaiton value}\right) \div 2^{signal\ processor\ resolution}$$

The signal processor 140 may allocate, to the first data region (data 1), a remainder processed according to Equation 2, and may allocate a quotient according to Equation 2 to the slow channel of the compatibility region or the second data region (data 2). That is, the signal processor 140 may allocate, to the first data region (data 1), a remainder corresponding to one digit of a SENT output in Equation 3 below, and may allocate, to the slow channel or the second data region (data 2), a quotient corresponding to two digits of the SENT output.

[Equation 3]

One digit of SENT output =

$$\left\{\left(\text{measured pressure} \times \frac{\left(\begin{array}{c}\text{available maximum value of ADC resolution} - \\ \text{available minimum value of ADC resolution}\end{array}\right)}{\text{pressure range}} + \text{initial locaiton value}\right) \div 2^{\text{signal processor resolution}}\right\} \text{remainder}$$

Two digits of SENT output =

$$\left\{\left(\text{measured pressure} \times \frac{\left(\begin{array}{c}\text{available maximum value of ADC resolution} - \\ \text{available minimum value of ADC resolution}\end{array}\right)}{\text{pressure range}} + \text{initial locaiton value}\right) \div 2^{\text{signal processor resolution}}\right\} \text{quotient}$$

For example, it is assumed that values obtained by processing a pressure value P, sensed by a pressure sensor, as a $2^{12 \text{ bits}}$ numeral system through the ADC 130 are the same as those illustrated in Table 1 below. In this case, the ADC 130 may have 14-bit resolution, and the SENT protocol may have 12-bit resolution.

TABLE 1

| P | Tf (12 bits) | Tf (14 bits) | Tf (two digits of 12-bit numeral system) | Tf (one digit of 12-bit numeral system) |
|---|---|---|---|---|
| 0 | 193 | 193 | 0 | 193 |
| 0.01687365 | 193 | 194 | 0 | 194 |
| 0.0337473 | 193 | 195 | 0 | 195 |
| 0.05062095 | 193 | 196 | 0 | 196 |
| 0.0674946 | 194 | 197 | 0 | 197 |
| 0.08436825 | 194 | 198 | 0 | 198 |
| 0.1012419 | 194 | 199 | 0 | 199 |
| 0.11811555 | 194 | 200 | 0 | 200 |
| 0.1349892 | 195 | 201 | 0 | 201 |
| 0.15186285 | 195 | 202 | 0 | 202 |
| 0.1687365 | 195 | 203 | 0 | 203 |
| 0.18561015 | 195 | 204 | 0 | 204 |
| 100 | 1674 | 6119 | 1 | 2415 |
| 200 | 3156 | 12045 | 3 | 933 |
| 250 | 3897 | 15009 | 4 | 193 |

In Table 1, the initial location value may be 193, an available maximum value of 12-bit resolution may be 3897, an available minimum value of 12-bit resolution may be 193, an available maximum value of 14-bit resolution may be 15009, an available minimum value of 14-bit resolution may be 193, and the pressure range may be 0 to 250 bar.

Referring to Table 1, it may be seen that when the pressure values P are 100, 200 and 250, the value Tf (14 bits) of the ADC 130 processed as 14 bits is out of the available 12-bit resolution range of the signal processor 140. Conventionally, the signal processor 140 compresses the value Tf (14 bits) of the ADC 130 processed as 14 bits, allocates the compressed value to the first data region, and transmits a corresponding message frame. However, the signal processor 140 of the present disclosure may process the value Tf (14 bits) of the ADC 130 processed as 14 bits as a $2^{12}$ numeral system, may allocate a remainder Tf (one digit of the 12-bit numeral system) according to the $2^{12}$ numeral system processing to the first data region, and may allocate a quotient Tf (two digits of the 12-bit numeral system) according to the $2^{12}$ numeral system processing to the slow channel of the compatibility region or the second data region. In this case, since each of the remainder and quotient according to the $2^{12}$ numeral system processing is not out of the available 12-bit resolution range, the signal processor 140 may output high-resolution data outputted by the ADC 130 without compressing the high-resolution data and a loss of the high-resolution data.

The signal processor 140 that receives the SENT message frame according to the present disclosure may decode information as in Equation 4 below.

Decoding information=two digits or more of SENT output$\times 2^{\text{signal processor resolution}}$+one digit of SENT output  [Equation 4]

Figure 4:
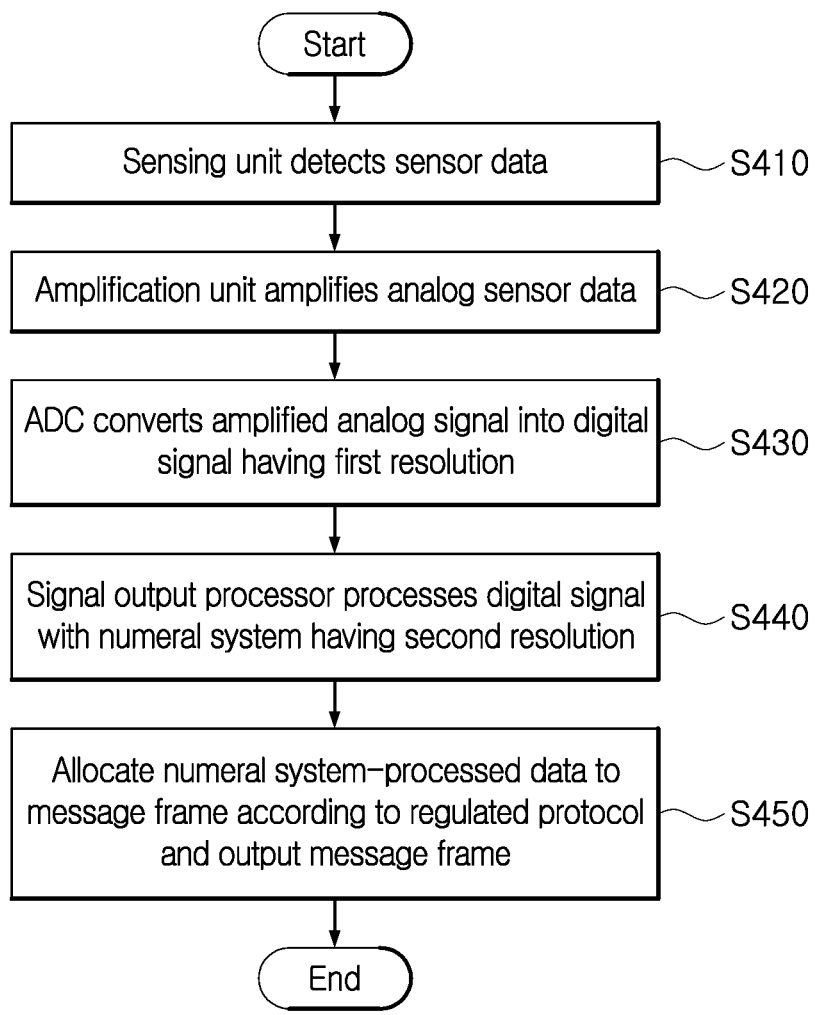
FIG. 4 is a flowchart for describing a method of processing a sensor signal according to an embodiment of the present disclosure.

FIG. 4 is a flowchart for describing a method of processing a sensor signal according to an embodiment of the present disclosure.

Referring to FIG. 4, the sensing unit 110 detects sensor data and transmits the sensor data to the amplification unit 120 (S410). The amplification unit 120 amplifies the analog signal sensed by the sensing unit 110 and transmits the amplified analog signal to the ADC 130 (S420). In this case, the amplification unit 120 may amplify the electric signal of the sensing unit 110, may filter the amplified signal, and then may convert the filtered signal into a signal having a voltage level which may be processed.

When step S420 is performed, the ADC 130 converts, into a digital signal having preset first resolution, the analog signal amplified by the amplification unit 120 (S430). In this case, the first resolution may be resolution set in the ADC 130.

When step S430 is performed, the signal processor 140 processes the digital signal, outputted by the ADC 130, as a numeral system having second resolution or higher (S440), allocates the processed digital signal to a message frame according to a preset regulated protocol, and outputs the message frame (S450). In this case, the signal processor 140 may process the digital signal, outputted by the ADC 130, as a $2^{signal\ processor\ resolution}$ numeral system or a numeral system having signal processor resolution or higher, may allocate a remainder according to the numeral system processing to the first data region of a SENT message frame, and may allocate a quotient according to the numeral system processing to the slow channel or second data region of the SENT message frame.

As described above, the apparatus and method for processing a sensor signal according to an aspect of the present disclosure can output high-resolution data without a loss of the high-resolution data without compressing the high-resolution data by processing the data, processed to have high resolution by the ADC, as a resolution numeral system having signal processor resolution or higher, allocating the data processed as the numeral system to a message frame according to a regulated protocol, and outputting the message frame.

Furthermore, in a system that requires high precision control, such as an autonomous vehicle, a product performance and resolution increase are required. In order to tolerate an inevitable signal loss of an output standard, an output signal processor for applying a high-resolution output standard needs to be newly developed. If the present disclosure is applied, however, the performance of the existing sensor and controller can be improved without developing a new sensor and controller and a rise in cost.

The present disclosure has been described with reference to the embodiments illustrated in the accompanying drawings, but the embodiments are merely illustrative. A person having ordinary knowledge in the art will understand that various modifications and other equivalent embodiments are possible from the embodiments. Accordingly, the true technical range of protection of the present disclosure should be defined by the appended claims.

What is claimed is:

1. An apparatus for processing a sensor signal, comprising:
   a sensing unit configured to sense an analog signal;
   an amplification unit configured to amplify the sensed analog signal;
   an analog-to-digital-converter (ADC) configured to convert the amplified analog signal into a digital signal having a first resolution; and
   a signal processor configured to process the digital signal with a numeral system having a second resolution, allocate the processed digital signal to a message frame according to the SENT protocol, and output the message frame as a SENT message frame;
   wherein the signal processor is configured to:
   allocate a remainder according to the numeral system to a first data region of the SENT message frame; and
   allocate a quotient according to the numeral system to a slow channel of a compatibility region or a second data region of the SENT message frame.

2. The apparatus of claim 1, wherein the numeral system is a $2^{signal\ processor\ resolution}$ numeral system.

3. The apparatus of claim 2, wherein the numeral system is a $2^{12}$ numeral system.

4. The apparatus of claim 1, wherein the digital signal is uncompressed by the signal processor prior to the signal processor allocating the processed digital signal to the message frame.

5. A method of processing a sensed analog signal, comprising:
   sensing an analog signal;
   amplifying the sensed analog signal;
   converting the amplified analog signal into a digital signal having a first resolution;
   processing the digital signal with a numeral system having a second resolution or higher;
   allocating the processed digital signal to a message frame according to a regulated protocol; and
   outputting the message frame;
   wherein the regulated protocol comprises a single-edge nibble transmission (SENT) protocol, and a message frame according to the SENT protocol comprises a SENT message frame;
   wherein the SENT message frame comprises a compatibility region comprising a tick time, a sync period and a slow channel, and a data region comprising a first data region and a second data region; and
   wherein outputting the message frame comprises:
   allocating a remainder according to the numeral system to the first data region of the SENT message frame, and
   allocating a quotient according to the numeral system to the slow channel of the compatibility region or the second data region.

6. The method of claim 5, wherein outputting the message frame comprises processing the digital signal with a $2^{second\ resolution}$ numeral system.

7. The method of claim 5, wherein:
   processing the digital signal is performed with a signal processor having a signal processor resolution; and
   the numeral system is a $2^{signal\ processor\ resolution}$ numeral system.

8. The method of claim 5, wherein processing the data signal does not comprise compressing the digital signal prior to allocating the processed digital signal to the message frame.

* * * * *